US007214898B1

(12) United States Patent
Margareten

(10) Patent No.: US 7,214,898 B1
(45) Date of Patent: May 8, 2007

(54) COVER FOR LIGHT SWITCH

(76) Inventor: Isamar Margareten, 721 Bedford Ave., Apt 12, Brooklyn, NY (US) 11206

( * ) Notice: Subject to any disclaimer, the term of this patent is extended or adjusted under 35 U.S.C. 154(b) by 0 days.

(21) Appl. No.: 11/370,771

(22) Filed: Mar. 7, 2006

(51) Int. Cl.
*H02G 3/14* (2006.01)
*H01H 13/04* (2006.01)

(52) U.S. Cl. .......................... 200/333; 174/66; 174/67

(58) Field of Classification Search ............ 200/43.22, 200/293, 330, 331, 333; 118/504, 505; 174/66, 174/67; 220/241, 242; D8/350–353; D13/152; 439/536
See application file for complete search history.

(56) References Cited

U.S. PATENT DOCUMENTS

| | | | | |
|---|---|---|---|---|
| 3,598,900 A | | 8/1971 | Drake | |
| 4,159,858 A | | 7/1979 | Toraya | |
| 273,084 A | | 3/1984 | Henkel | |
| 279,860 A | | 7/1985 | Schwalbe | |
| 283,007 A | | 3/1986 | Henkel | |
| 297,396 A | | 8/1988 | Schwalbe | |
| 308,814 A | | 6/1990 | Kintigos et al. | |
| 314,556 A | | 2/1991 | Aggson | |
| 5,003,128 A | * | 3/1991 | Grondin | 174/67 |
| 331,386 A | | 12/1992 | Koessler | |
| 5,456,373 A | | 10/1995 | Ford | |
| 5,675,125 A | * | 10/1997 | Hollinger | 174/66 |
| 5,727,958 A | | 3/1998 | Chen | |
| 5,829,622 A | | 11/1998 | Neuman | |
| 5,929,379 A | * | 7/1999 | Reiner et al. | 174/66 |
| 5,955,702 A | | 9/1999 | Grossman et al. | |
| 6,103,974 A | | 8/2000 | Erdfarb | |
| 6,218,616 B1 | | 4/2001 | Bates et al. | |
| 6,476,321 B1 | | 11/2002 | Shotey et al. | |
| 6,723,922 B1 | | 4/2004 | Shotey et al. | |
| 6,927,341 B1 | * | 8/2005 | Crane | 174/66 |
| 510,256 A1 | | 10/2005 | Genelle | |
| 6,974,925 B2 | * | 12/2005 | Whitman | 200/333 |
| 6,977,342 B1 | * | 12/2005 | Maltby et al. | 174/66 |
| 7,022,915 B1 | * | 4/2006 | Galguera | 174/66 |
| 425,768 A1 | | 5/2006 | Staley | |
| 7,071,414 B2 | * | 7/2006 | Kim | 174/66 |

* cited by examiner

FOREIGN PATENT DOCUMENTS

JP 5-235560 10/1993

OTHER PUBLICATIONS

"Decorative Light Switchplate Wisdom" switchrits.com http;www.switchrits.com/? source= ou2kwLswitchRover platé&ouraw=switch%20plate%eocover2Dukey= switch%20cover%20plate2ourtc= standard 3 pages, printed Dec.13, 2005.

*Primary Examiner*—Michael A. Friedhofer
(74) *Attorney, Agent, or Firm*—Steven Horowitz

(57) ABSTRACT

A cover for a decor light switch or an old fashioned light switch, comprises a hollow frame having a left side, a right side, a top, a bottom, a flat or convex front and an open rear, a first small annular member projecting from the front in an area of the top and having a depth corresponding to a width of the left and right sides, a first cylindrical magnet inside the first small annular member, a second small annular member projecting from the front in an area of the bottom and having a depth corresponding to a width of the left and right side, a second cylindrical magnet inside the second small annular member, each of the magnets positioned so that they are aligned with and able to contact a head of a metal screw on the base plate, the magnets together strong enough to hold the cover. For the old fashioned light switch, the convex front has a central area of sufficient height to receive a switch element of the old-fashioned toggle light switch.

4 Claims, 12 Drawing Sheets

PRIOR ART

PRIOR ART

COVER FOR LIGHT SWITCH

FIELD OF THE INVENTION

The field of this invention is covers for light switches, and more particularly, covers for light switches

BACKGROUND OF THE INVENTION AND DISCUSSION OF THE PRIOR ART

Light switches attached to a wall, or more precisely, the base plate that the wall light switch fits into, has been standardized in the United States for a long time. Notwithstanding that, there are two commonly found versions of light switches in terms of their physical structure. The first version shall be referred to as the "old-fashioned toggle light switch". The second version shall be referred to as the "decor light switch". All light switches within a particular version have the identical physical structure. Furthermore, all electrical light switches in both versions have a specific height and width, as measured by the wall plate that the switch is embedded into.

It should of course be understood that although the term "light switches attached to a wall" has been used, this term is intended to also include light switches that may be found on a ceiling or even on a beam within a home or office, for example a shut off switch for a boiler or air conditioning system. In short the two versions of light switches are intended to cover any light switch in whatever context that looks like the light switches appearing in FIG. 7 and FIG. 12, as explained more fully below.

For religious reasons, people and families that observe the Sabbath do not use electricity or electrical appliances. They do not turn lights on or off from during the period from sundown Friday through sundown Saturday. Sabbath observers spend a great deal of time preparing the home for the Sabbath including setting the lights in the home in the mode that it is desired that they be in for the duration of the Sabbath. A family prior to the Sabbath might for example set the lights in the house in a manner that the main light is "on" in certain rooms and off in other rooms, for example rooms in which the primary activity there is sleeping. There is a danger that the settings of the light switches in the home may be interfered with accidentally or deliberately during the Sabbath at the cost of placing the family in a situation of extreme inconvenience during the remainder of the Sabbath. Since many families have children in the home who may interfere with the settings of the light switches by turning them on or off, there is a need among Sabbath observer families to protect the light switches from such interference.

Furthermore, interference with the On/Off mode of the light switches can be caused accidentally by an adult also. An adult leaning against a wall may accidentally turn a light off in a room where light is required or turn a light on in a room where people need to sleep. Thus, there is a need to protect and maintain the light switch settings in the home.

In addition, strictly observant Sabbath observers are not even allowed to touch the light switch or electric outlet. Therefore, it is beneficial for them to have some kind of reminder system that reminds them not to touch these objects.

The preparations for the Sabbath involve many things, including food preparation and a myriad of tasks that have to be done to be able to manage during the day without work, such as turning on lights or using the telephone. It is therefore very important that the solution to problem of avoiding interference with the light switches be such as to not require a great deal of time. Even additional seconds can be a problem since there is an inevitable rush of tasks that have to be completed prior to the Sabbath and each additional one is burdensome if it is time-consuming.

An additional separate but related problem is the need to protect electrical outlets on the walls from being interfered with. There is a safety problem in that children can play with them. Electrical outlets on a wall (or ceiling) come in standardized form in which there are essentially three kinds of outlets of uniform size within each type. In addition, electrical wall outlets are formed on a base plate that is of uniform height and width.

In addition, there is a compelling safety and convenience need for preventing tampering with light switches in boiler rooms, "main lobby" lights or other switches that are kept on permanently or for long periods of time. This also saves energy from a switch being on when it should be off. In addition, the very act of turning light or electric switches on an off unnecessarily wastes unnecessary energy.

Thus there is a compelling need to cover the electrical outlets in a house in a way that is safe. Furthermore, there is need to protect the outlets in a way that is attractive and does not detract from the elegance of the decor of the home, and ideally in a way that enhances the decor. In addition, there is a need to cover the light switches in a way that is easy to apply and remove. Furthermore, there is a need to cover the light switches in a way that provides a convenient manner of storing the covers so that is easy to access them. In addition, there is a need for a way to cover light switches and electric outlets that is safe.

FIGS. 1 and 2 show a prior art attempt to cover old-fashioned toggle light switches and arrive at a solution to the issues and problems referred to above. This involves unscrewing the two screws in the electric light switch, for example the two screws in the old-fashioned toggle light switch, and replacing them by female snap members. An oval cover containing male snap members is then snapped onto the light switch by mating the male and female snaps.

This prior art method and apparatus is inconvenient because it requires assembly and disassembly. The whole point of the cover is to create convenience for the Sabbath observant family and for the family who wishes to make electric outlets in their home safe. Since convenience is crucial, there is a need for a method and apparatus that does not create an additional task of something to do such as assembly and disassembly. In addition, because of the assembly and disassembly of the electric outlet or light switch base plate, there can be a danger and/or people will undoubtedly perceive a danger involved in working with electric apparatuses (light switches and electric outlets) by disassembling and reassembling them. There is a need for a more convenient way of covering light switches and electric outlets and one that is safer and perceived as safer.

SUMMARY OF THE PRESENT INVENTION

The present invention is a cover for a decor light switch or an old fashioned light switch, which can also be used to cover electric outlets. The cover for the decor light switch comprises a hollow frame having a left side, a right side, a top, a bottom, a flat or convex front and an open rear, a first small annular member projecting from the front in an area of the top and having a depth corresponding to a width of the left and right sides, a first cylindrical magnet inside the first small annular member, a second small annular member projecting from the front in an area of the bottom and having a depth corresponding to a width of the left and right side, a second cylindrical magnet inside the second small annular member, each of the magnets positioned so that they are aligned with and able to contact a head of a metal screw on the base plate, the magnets together strong enough to hold the cover. The main difference for the cover for the old fashioned light switch is that the cover has a convex front to accommodate the projecting switch. element. The convex front has a central area of sufficient height to receive the switch element of the old-fashioned toggle light switch.

IMPORTANT OBJECTS AND ADVANTAGES

The following important objects and advantages of the present invention are:

(1) to provide a cover for an electric switch that is sturdy because of its construction and the way it attaches;

(2) to provide such a cover that is elegant, sleek and attractive;

(3) to provide such a cover that is easier to make than prior art covers;

(4) to provide such a cover that is lightweight;

(5) to provide such a cover that is not bulky;

(6) to provide such a cover that requires no assembly or disassembly in order to use it on a light switch or on an outlet;

(7) to provide such a cover that can be attached in a rotated position for storage;

(8) to provide such a cover that can be attached in a rotated position for storage on an electric outlet and still allow lugs to be inserted into the outlet and appliances to be functioning;

(9) to provide such a cover that can be kept on the light switch or outlet permanently and hence is easier to find and to apply;

(10) to provide such a cover that is safe;

(11) to provide such a cover that is stackable;

(12) to provide such a cover that can be used on any electric light switch in the country;

(13) to provide such a cover that has a simple embodiment for both the decor light switches and for the old-fashioned toggle light switches;

(14) to provide such a cover that can also be applied safely to electrical outlets both those that have two screws and those that have one screw on their base plate;

(15) to provide such a cover that is very easy to apply and use;

(16) to provide such a cover that does not require taking off the base plate of the light switch or electric outlet in order to use the cover effectively;

(17) to provide such a cover that is easy and inexpensive to manufacture;

(18) to provide such a cover that requires the minimum physical structure needed to serve its function;

(19) to provide such a cover that can be rotated while in place;

(20) to provide such a structure that cannot easily be removed by sliding it off;

(21) to provide such a cover that prevents children from turning lights on or off during the Sabbath or during any other period of time that the household does not wish such lights to be tampered with;

(22) to provide a cover that serves as a reminder to warn people not to touch the light switch or outlet;

(23) to provide such a cover that prevents adults from accidentally turning a light switch on or off.

DETAILED DESCRIPTION OF THE PREFERRED EMBODIMENT

Figure 12:
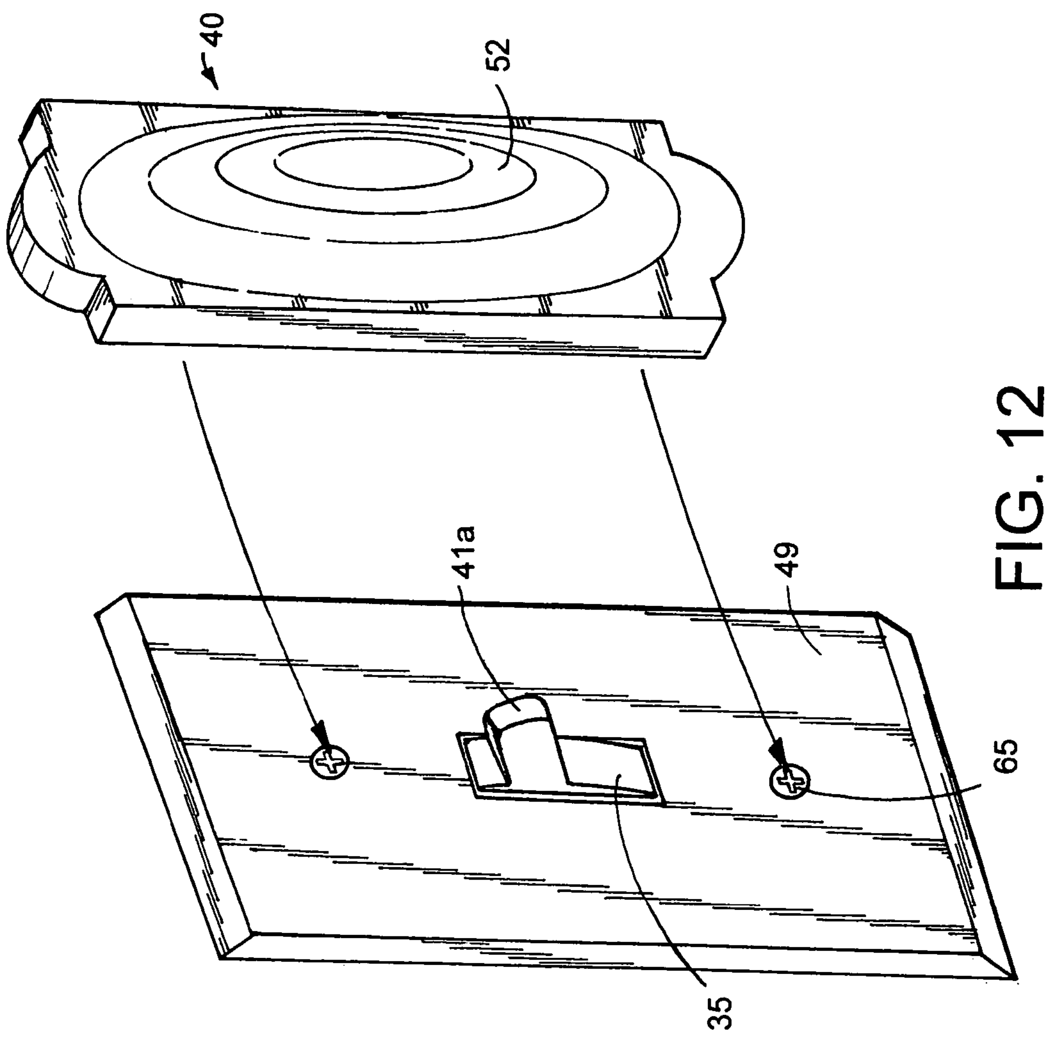
FIG. 12 is a front perspective view of the cover of FIG. 10 alongside an old-fashioned toggle light switch.
Figure 16:
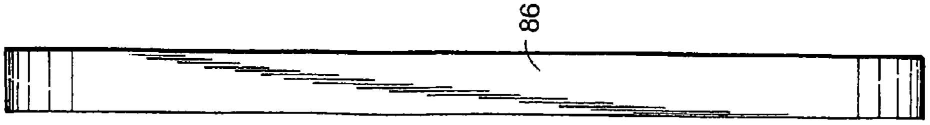
FIG. 16 is a side view of the cover of FIG. 13.
Figure 15:
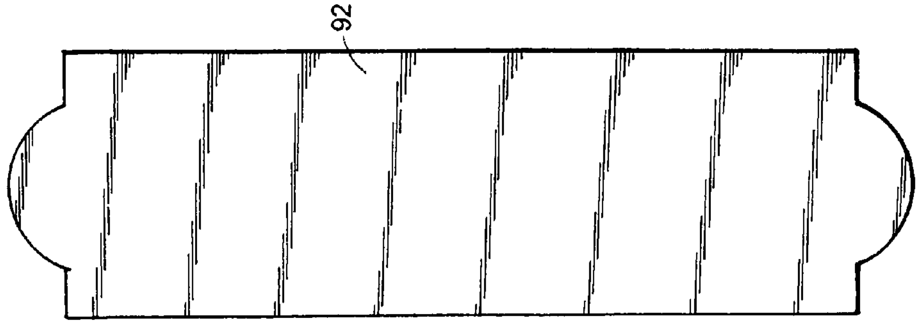
FIG. 15 is a front elevational view of the cover of FIG. 13.
Figure 14:
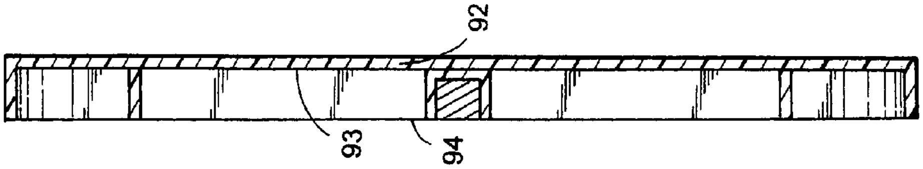
FIG. 14 is a vertical sectional view of the cover of FIG. 13 taken along the right side of the cover of FIG. 13.
Figure 13:
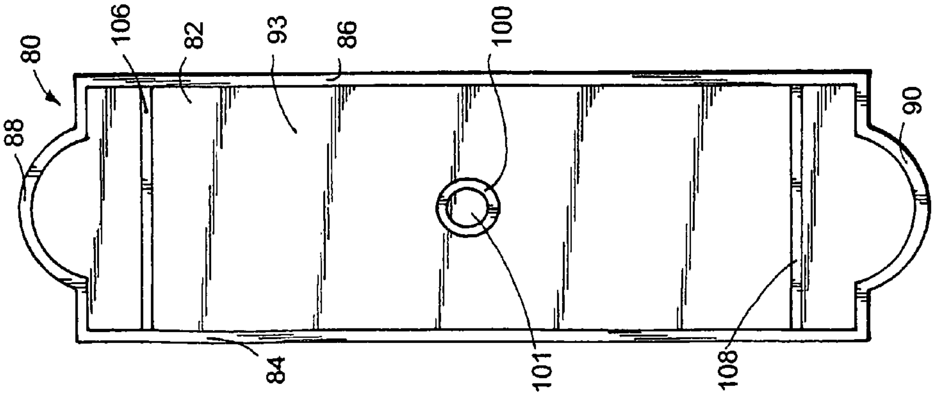
FIG. 13 is a rear elevational view of a cover of the present invention for an electric outlet with one screw.
Figure 17:
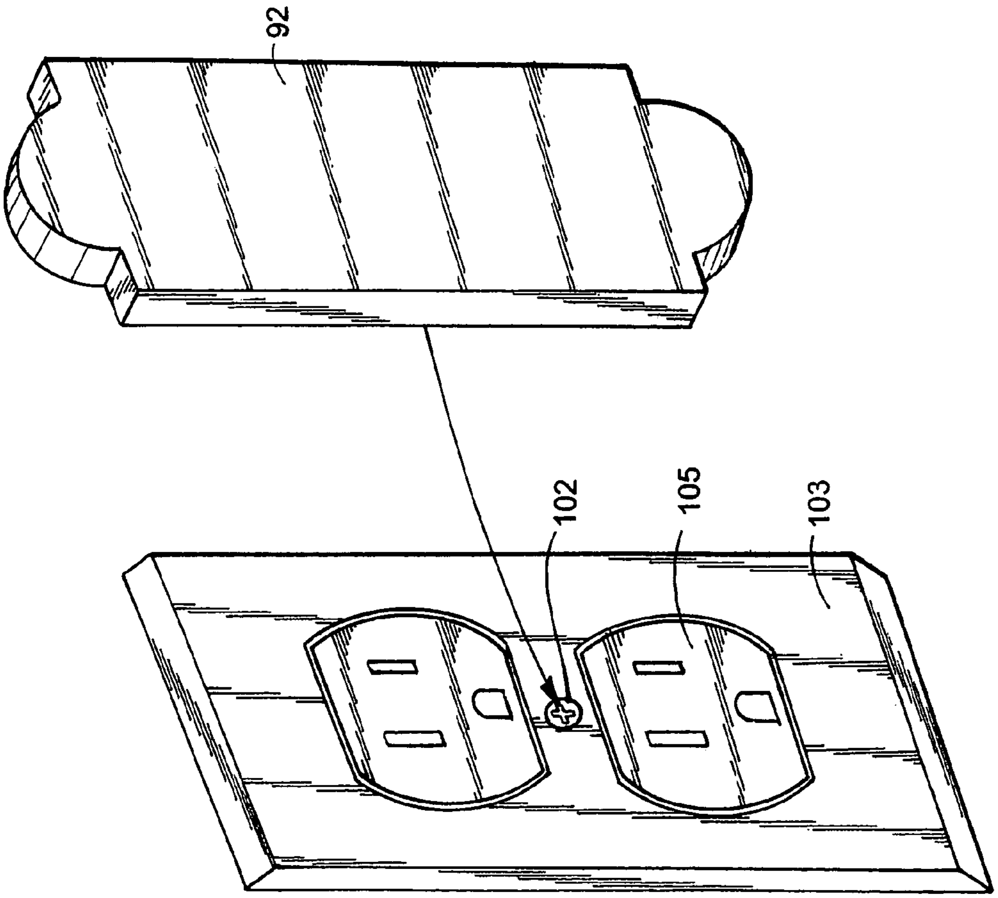
FIG. 17 is a front perspective view of the cover of FIG. 15 alongside an electric outlet with one screw.
Figure 18:
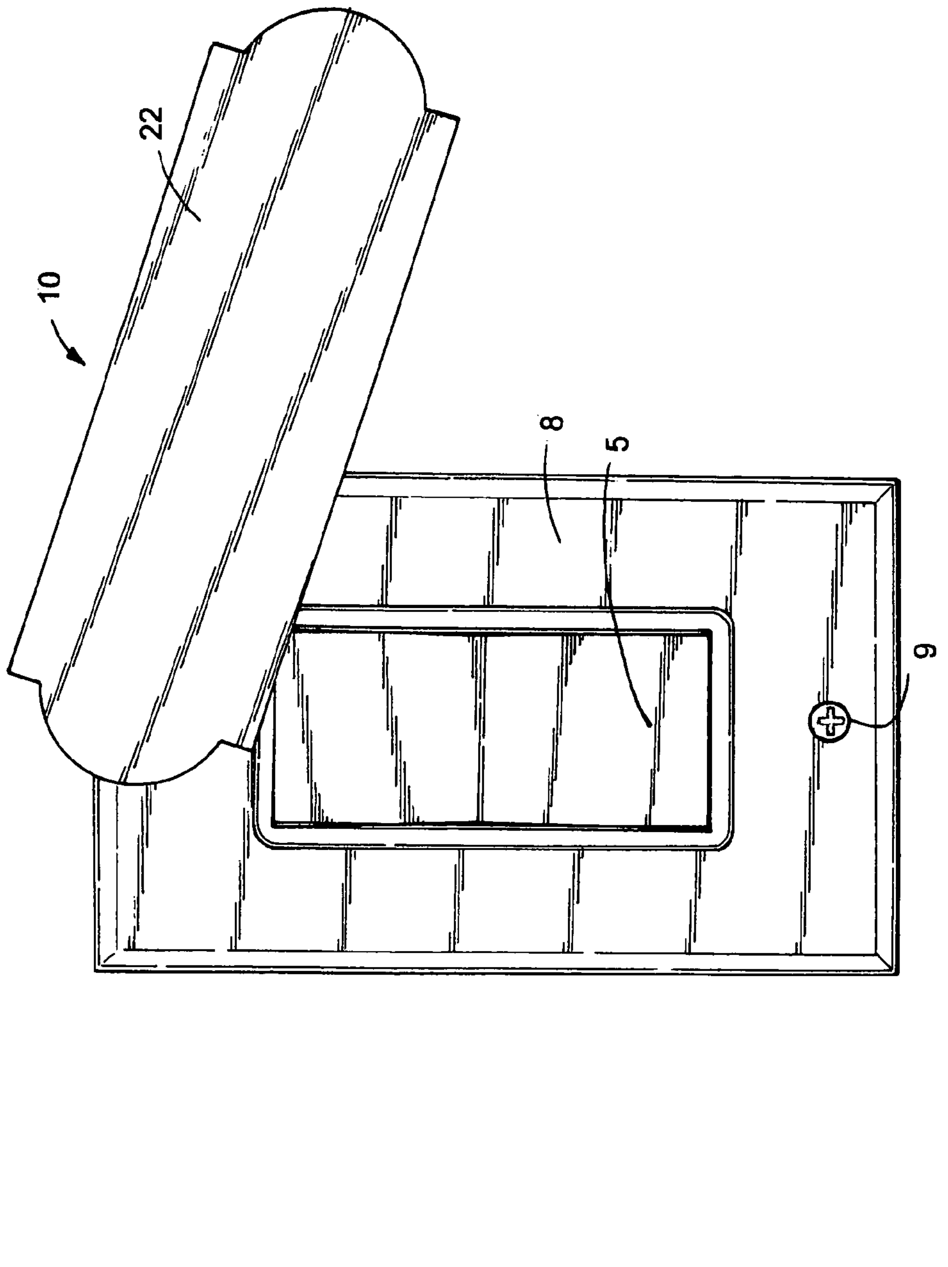
FIG. 18 is a cover of the present invention for a decor light switch on the decor light switch in a rotated or stored position.

As best seen in the left side of FIG. 12, the term "old-fashioned toggle light switch" as used herein shall refer to the kind of light switches depicted in FIG. 12 that have been commonplace on walls for decades in the United States and structurally features a switch member that protrudes approximately half an inch away from the base plate and through a rectangular opening that is approximately ¾ inches by ¼ inches and wherein the switch member protrudes in both the "OFF" and "ON" position at a slanted angle with respect to the base plate. As explained previously, the term "walls" when speaking about light switches (or electric outlets) on "walls" as used herein is broad enough to include not just walls per se but also other entities that accommodate light switches or outlets, for example ceilings, floors, beams, etc.

Figure 7:
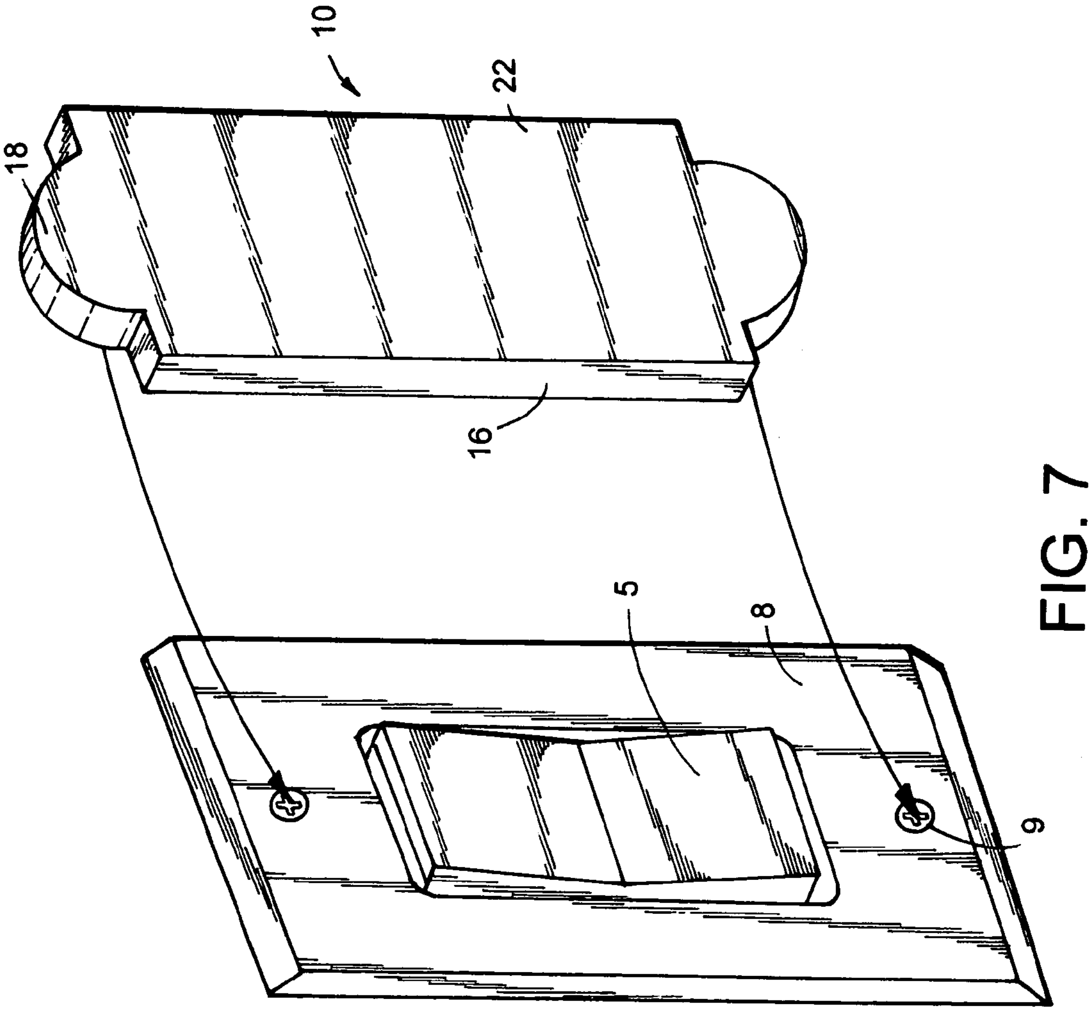
FIG. 7 is a front perspective view of the cover of FIG. 5 alongside a decor light switch.
Figure 8:
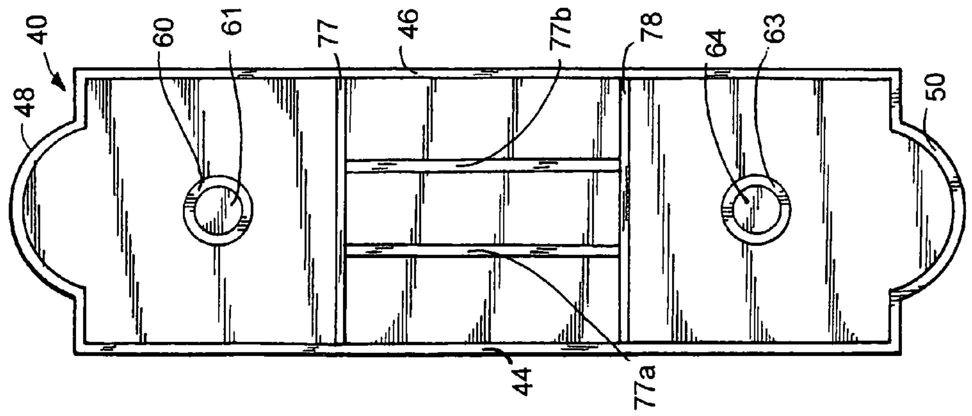
FIG. 8 is a rear elevational view of a cover of the present invention for an old-fashioned toggle light switch.
Figure 9:
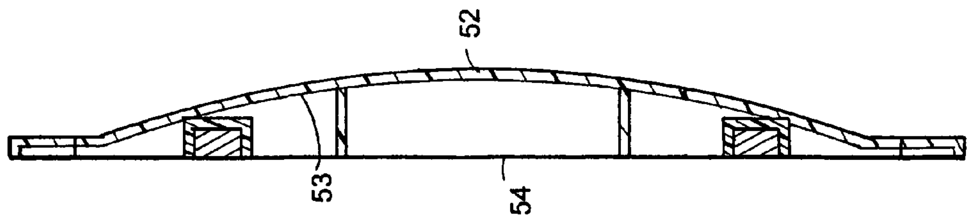
FIG. 9 is a vertical sectional view of the cover of FIG. 8 taken along the right side of the cover of FIG. 8.
Figure 10:
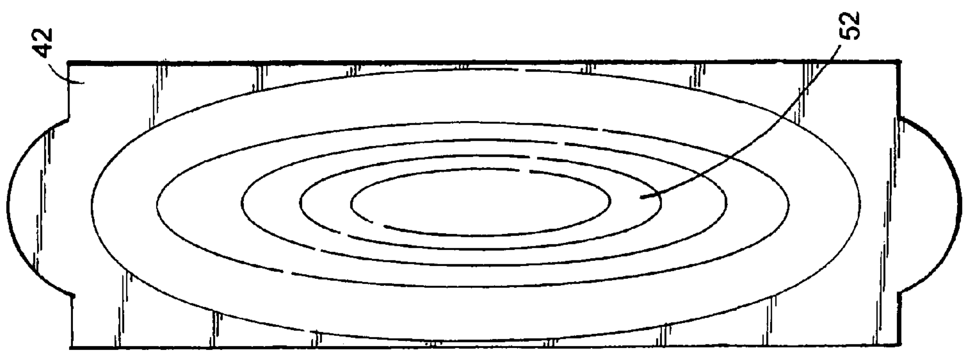
FIG. 10 is a front elevational view of the cover of FIG. 8.
Figure 11:
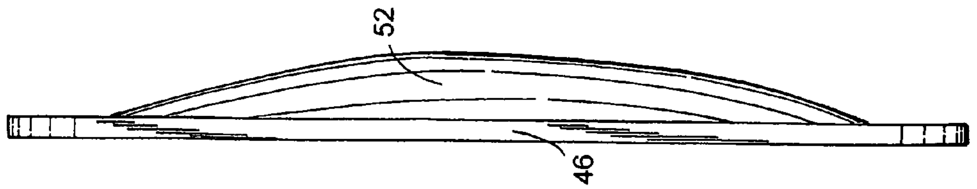
FIG. 11 is a side view of the cover of FIG. 8.

The other kind of popular light switch is called the "decor light switch" and is best appreciated from the left side of FIG. 7.

The physical structure of all light switches within each of the two categories of light switches are identical. This includes the exact location of the screws. Thus the covers of the present invention are attachable to any light switch.

The apparatus of the present invention will now be illustrated by reference to the accompanying drawings in FIGS. 1–23. The cover of the present invention for the decor light switch has been assigned reference numeral 10 Other elements have been assigned the reference numerals referred to below.

As best seen in FIG. 3, FIG. 4, FIG. 5, FIG. 6, FIG. 7, FIG. 18, FIG. 19, FIG. 21 and FIG. 22, cover 10 is a cover for a decor light switch 5 of the type where the decor light switch 5 has a base plate 8. Cover 10 comprises a hollow frame 12 having a left side 14, a right side 16, a top 18, a bottom 20, a flat front 22 and an open rear 24. Cover 10 also includes a first small annular member 30 projecting from the "rear" wall 23 of the front 22 in an area of the top 18 and having a depth corresponding to a width of the left side 14 and the right sides 16.

Figure 1:
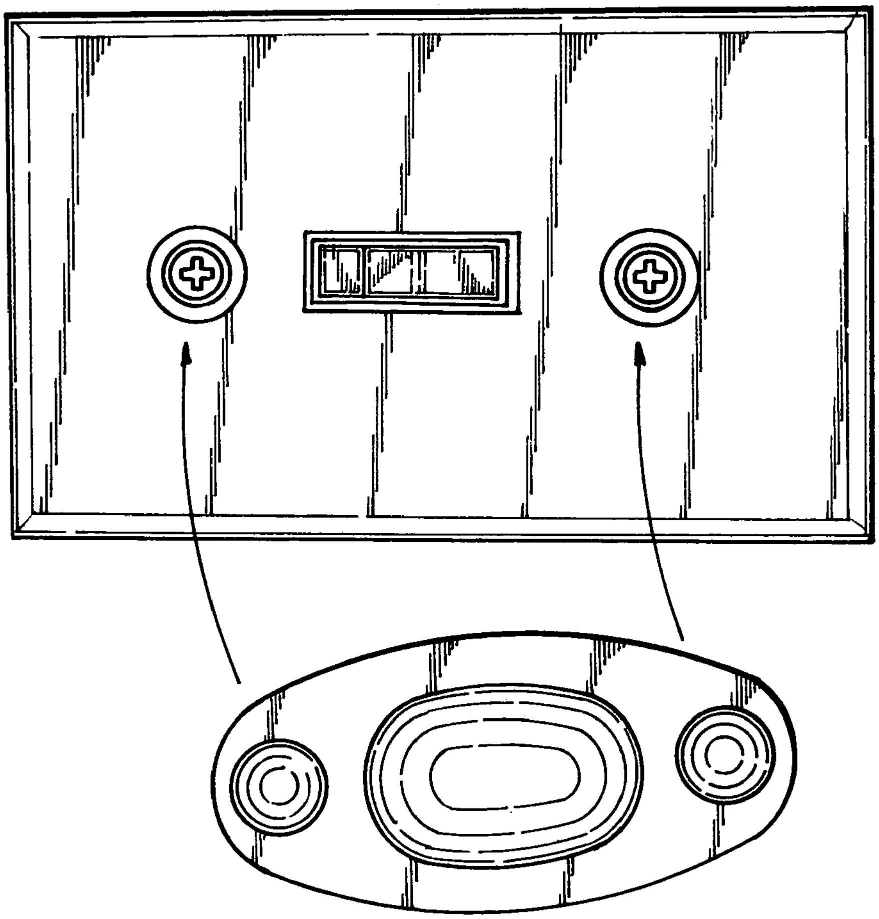
FIG. 1 is a front elevational view of an old-fashioned toggle light switch and a prior art device for covering an old-fashioned toggle light switch.
Figure 2:
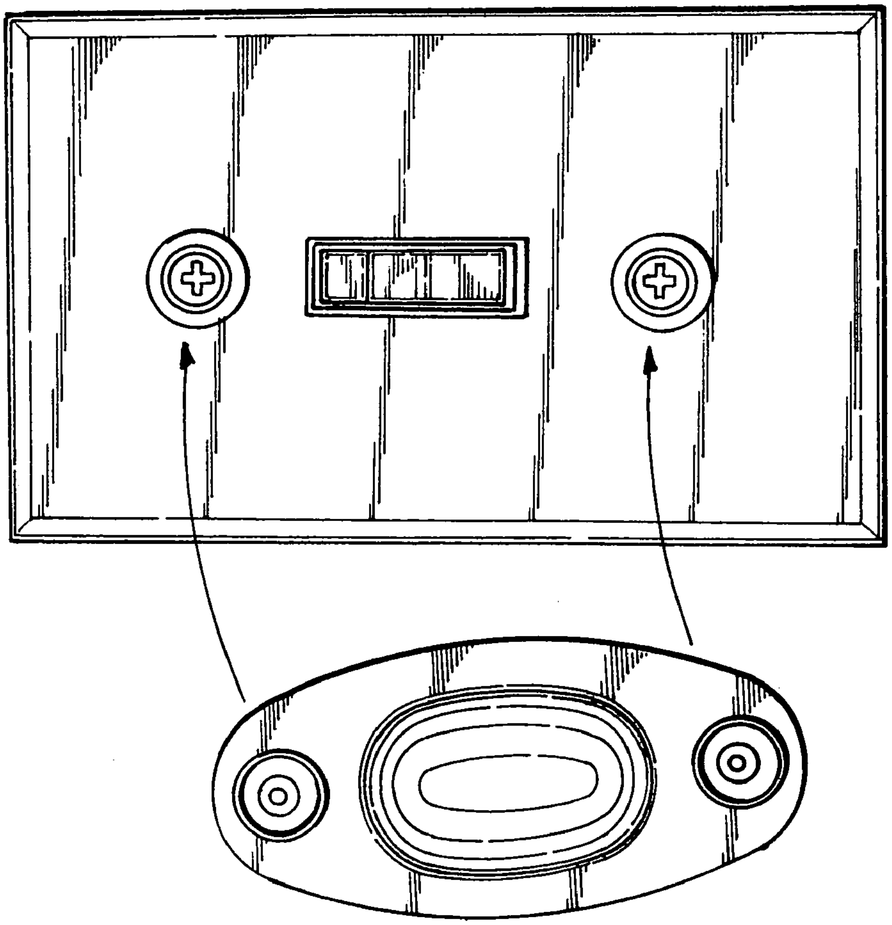
FIG. 2 is a front elevational view of an old-fashioned toggle light switch and a rear view of the prior art device of FIG. 1.
Figure 6:
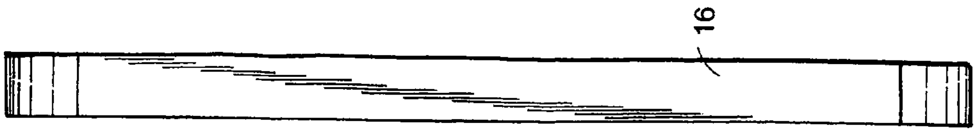
FIG. 6 is a side view of the cover of FIG. 3.
Figure 5:
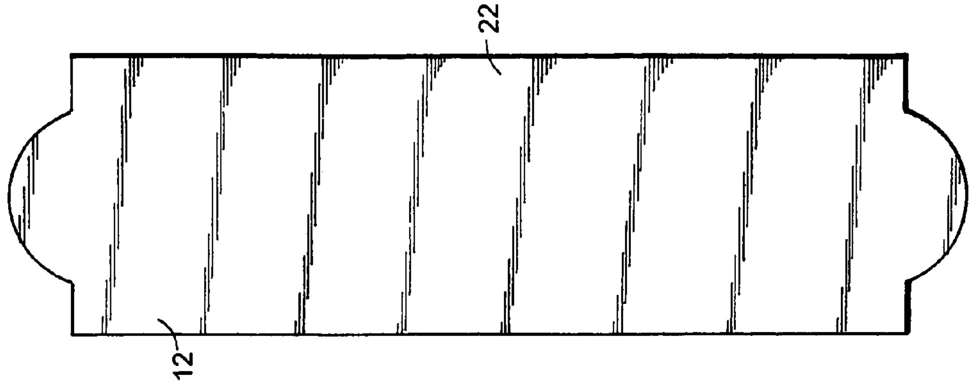
FIG. 5 is a front elevational view of the cover of FIG. 3.
Figure 4:
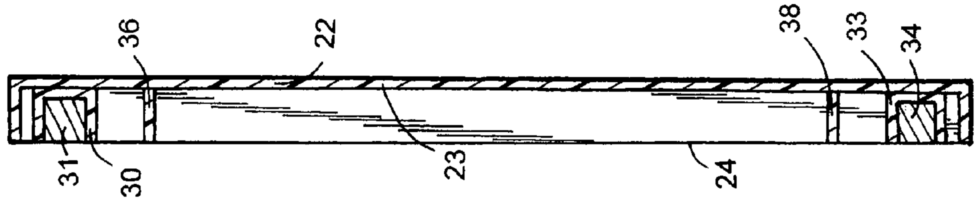
FIG. 4 is a vertical sectional view of the cover of FIG. 3 taken along the right side of the cover of FIG. 3.
Figure 3:
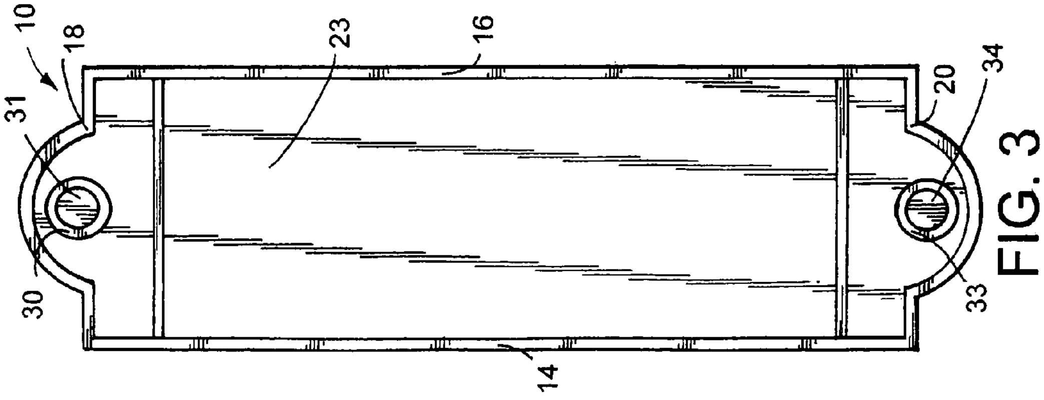
FIG. 3 is a rear elevational view of a cover of the present invention for a decor light switch.

As best seen from FIGS. 3–4, cover 10 also includes a first cylindrical magnet 31 located securely inside the first small annular member 30. In a preferred embodiment, the first cylindrical magnet 31 fits into the first small annular member snugly so that it cannot easily fall out during use. Cover 10 includes a second small annular member 33 projecting from the rear wall 23 of the front 22 in an area of the bottom 20 and having a depth corresponding to a width of the left and right side. Cover 10 also includes a second cylindrical magnet 34 located securely inside the second small annular member 33. In a preferred embodiment, the second cylindrical magnet 34 fits into the second small annular member snugly so that it cannot easily fall out during use Each of the magnets 31, 34 is positioned so that they are aligned with and are able to contact a head of a metal screw 9 on the base plate 8 of the light switch 5.

Figure 19:
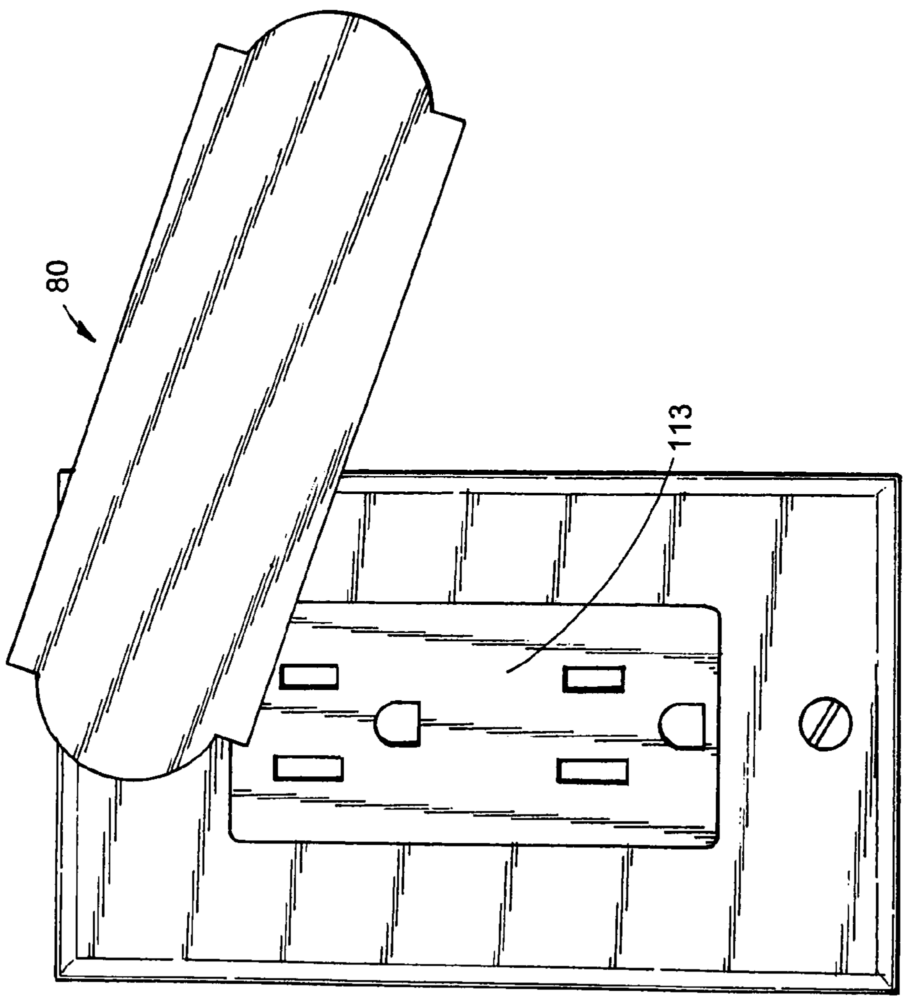
FIG. 19 is a cover of the present invention for an electric outlet on the electric outlet in a rotated or stored position.

It is a requirement that the magnets 31, 34 be together strong enough to hold the cover 10 in place on the light switch 5. In a preferred embodiment, the magnets are strong enough that only one of them is strong enough alone to hold the cover 10 in place on the light switch 5. This is so that the cover 10 can be stored in a rotated position when not in use, as best seen in FIG. 19. This allows easily locating the cover 10. It has the further advantage, when the cover is applied to an electrical outlet 113 (see FIG. 19), of allowing appliances to be plugged in even when the cover is stored on an electric outlet. This is a convenience.

In a preferred embodiment, cover 10 includes a top internal horizontal wall 36 below the first small annular member 30 to make it harder to slide the cover up and down and includes a bottom internal horizontal wall 38 above the second small annular member 33, to make it harder to slide the cover 10 up and down and thereby slide off light switch 5 accidentally or improperly. In addition, left 14 and right side 16 of cover 10 limit the ability of cover 10 to slide right and left and thereby slide off light switch accidentally or improperly.

In a preferred embodiment, the width of the cover is between approximately one and one quarter and approximately one and one half inches. However, in other preferred embodiments, this width can be more or less than this amount, provided cover 10 conceals the entirety of light switch 5 itself when cover 10 is in place covering light switch 5. Therefore, in a preferred embodiment, cover 10 is just more than the minimum width necessary to cover lights switch 5. In an alternative embodiment, cover 10 is wider than that but still less than the full width of base plate 8. Although the present invention does contemplate that an elegant version of cover 10 can be as wide of base plate 8, the preferred embodiment relies on the fact that the most elegant and lightweight version of cover 10 will not be as wide as base plate 8.

In one preferred embodiment, the depth of the first cylindrical magnet 31 is less than the depth of the first small annular member 30 and the depth of the second cylindrical magnet 34 is less than the depth of the second small annular member 33. This discrepancy is designed to accommodate the height of the head of the screws on the base plate 8 which project out slightly from the base plate 8.

As best seen in FIG. 8, FIG. 9, FIG. 10, FIG. 11, FIG. 12, FIG. 20 and FIG. 23, a cover 40 for an old-fashioned toggle light switch 35, the old-fashioned toggle light switch 35 has a base plate 49. The cover 40 comprises a hollow frame 42 having a left side 44, a right side 46, a top 48, a bottom 50, a convex front 52 and an open rear 54. The convex front 52 has a central area 53 of sufficient height to receive a switch element **35*a* of the old-fashioned toggle light switch 35**.

In a preferred embodiment, cover 40 includes a first small annular member 60 projecting from the rear wall 53 of the front 52 in an area of the top 48 and has a depth corresponding to a width of the left side 44 and right sides 46.

Cover 40 also has a first cylindrical magnet 61 located securely inside the first small annular member 60 and a second small annular member 63 projecting from the rear wall 53 of the front in an area of the bottom and having a depth corresponding to a width of the left side 44 and right side 46. In a preferred embodiment, magnet 61 fits snugly inside member 60.

Cover 40 includes a second cylindrical magnet 64 located securely inside the second small annular member 63. In a preferred embodiment, magnet 64 fits snugly inside member 63. Each of the magnets 61, 64 are positioned so that they are aligned with and able to contact a head of a metal screw 65 on the base plate 49.

As with the cover 10 for the decor light switch, the magnets 61, 64 of cover 40 for the old-fashioned toggle light switch are together strong enough to hold the cover 40. In a preferred embodiment, the magnets 61, 64 are strong enough that only one of them is strong enough alone to hold the cover 40 in place on the light switch. This is so that the cover 40 can be stored in a rotated position when not in use. This allows easily locating the cover 40. It has the further advantage, when the cover is applied to electrical outlets, of allowing appliances to be plugged in even when the cover is stored on an electric outlet. This is a convenience.

The cover 40 also includes a top internal horizontal wall 77 below the first small annular member 60 to make it harder to slide the cover up and down (and off) and includes a bottom internal horizontal wall 78 above the second small annular member 63. These walls 77, 78 are designed to make it more difficult to slide the cover 40 up and down and off light switch 35. Therefore, the cover 40 would have to be removed by pulling against the force of the magnets 61, 64. In a preferred embodiment, top internal horizontal wall 77 and bottom internal horizontal wall 78 together form a square along with the left side 44 and rights side 46. In an alternative embodiment, walls 77, 78 and left side 44 and rights side 46 form a rectangle.

In one preferred embodiment, additional left internal wall 77*a* and right internal wall 77*b* closely surround light switch 35 and prevent sliding of cover 40 left and right.

In a preferred embodiment, the width of the cover 40 is between approximately one and one quarter and approximately one and one half inches. However, in other preferred embodiments, this width can be more or less than this amount, provided cover 40 conceals the entirety of light switch 35 itself when cover 40 is in place covering light switch 35. Although the present invention does contemplate that an elegant version of cover 40 can be as wide of base plate 49, the preferred embodiment relies on the fact that the most elegant and lightweight version of cover 40 will not be as wide as base plate 49.

For the reasons provided earlier regarding accommodating the heads of the screws, as before, in one preferred embodiment, the depth of the first cylindrical magnet 61 is less than the depth of the first small annular member 60 and the depth of the second cylindrical magnet 64 is less than the depth of the second small annular member 63.

Figure 20:
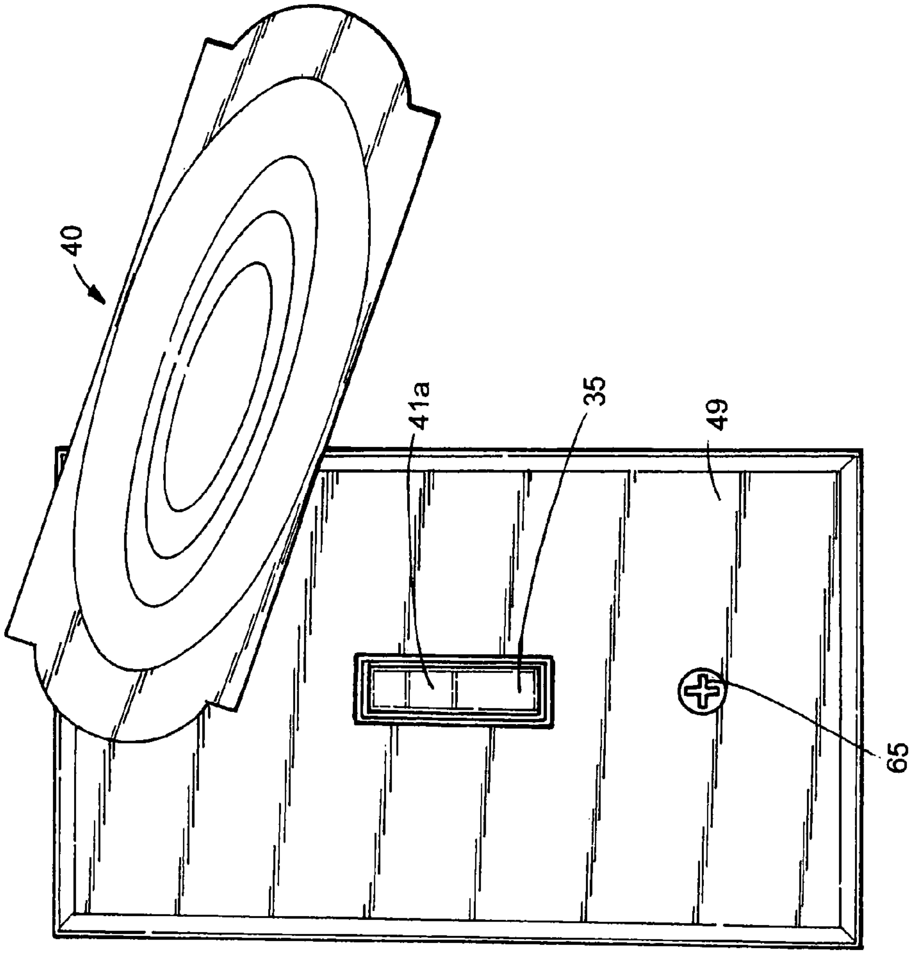
FIG. 20 is a cover of the present invention for an old-fashioned toggle light switch on the old-fashioned toggle light switch in a rotated or stored position.
Figure 23:
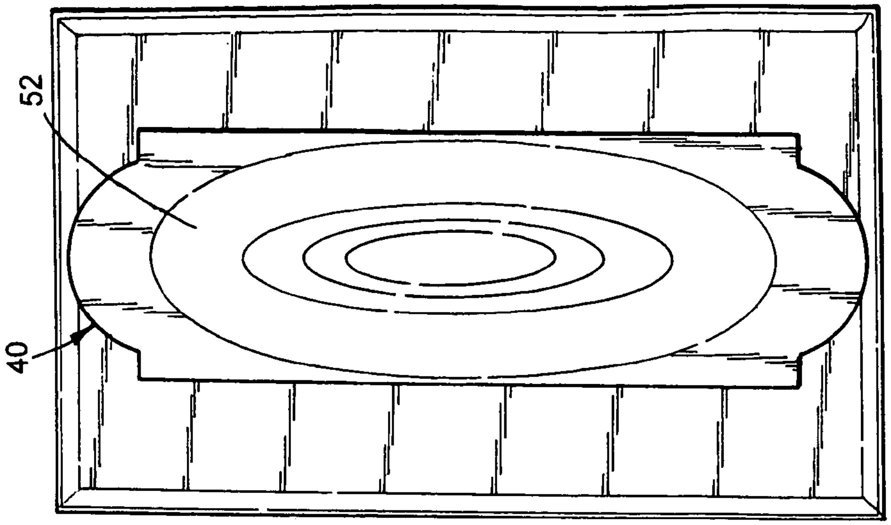
FIG. 23 is a cover of the present invention for an old-fashioned toggle light switch on the old-fashioned toggle light switch in its normal position during use.
Figure 22:
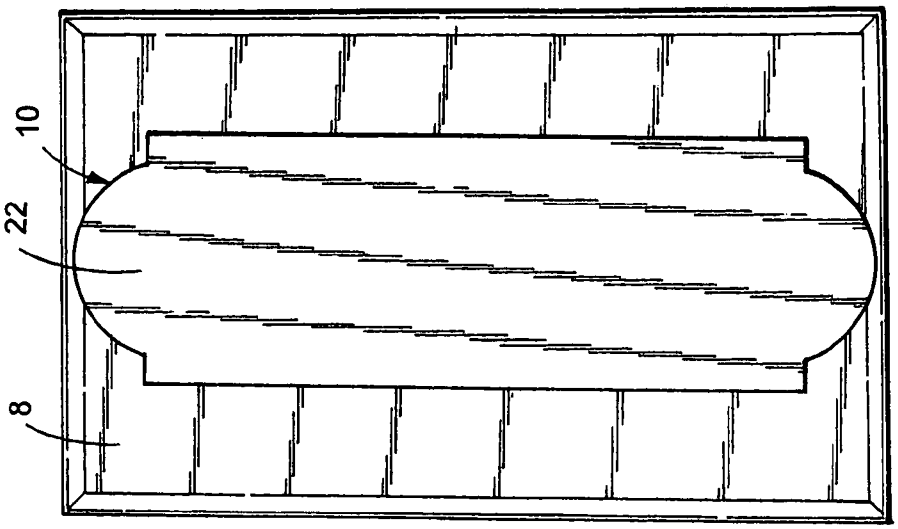
FIG. 22 is a cover of the present invention for a decor light switch on the decor light switch in its normal position during use.
Figure 21:
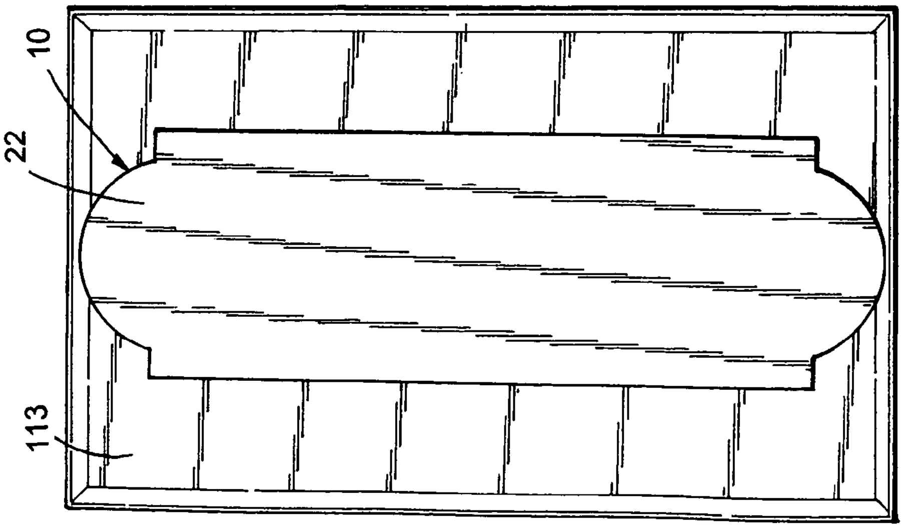
FIG. 21 is a (decor switch) cover of the present invention in its normal position during use on either an electric outlet or an electric outlet with one screw.

It should be noted that in a preferred embodiment the magnets 61, 64 inside annular members 60, 63 of cover 40 are located further away from the top 48 and bottom 50 of cover 40 than are mgnets 31, 34 from their respective top 18 and bottom 20 in cover 10. Accordingly, it is noted that FIG. 20 is not intended to be a precise illustration of how cover 40 will fit on the base plate 49.

As shown in FIGS. 13–17, a slightly variant cover 80 but one that is basically similar to the cover 10 for the decor light switches, can be used on the electrical outlets that have a single screw. Accordingly, as best seen in FIGS. 13–16, cover 80 is a cover for an electric outlet having one screw. Cover 80 comprises a hollow frame 82 having a left side 84, a right side 86, a top 88, a bottom 90, a flat front 92 and an open rear 94. Cover 80 also includes a first small annular member 100 projecting from the rear wall 93 of the front 92 in the center of frame 82 and having a depth corresponding to a width of the left side 84 and the right sides 86.

As best seen from FIGS. 3–4, cover 80 also includes a first cylindrical magnet 101 located securely inside the first small annular member 100. Preferably, magnet 101 fits snugly inside member 100. Magnet 101 is positioned so that it is aligned with and is able to contact the head of metal screw 102 on the base plate 103 of the electric outlet 105.

It is a requirement that the magnet 101 be strong enough to hold the cover 80 in place on the electric outlet 105.

In a preferred embodiment, cover 10 includes a top internal horizontal wall 106 near top 88 and a bottom internal horizontal wall 108 near bottom 90 to make it harder to slide the cover 10 off accidentally or improperly.

In a preferred embodiment, the width of the cover 80 is between approximately one and one quarter and approximately one and one half inches. However, in other preferred embodiments, this width can be more or less than this amount, provided cover 80 conceals the entirety of the electric outlet 105 when cover 80 is in place. Therefore, in a preferred embodiment, cover 80 is typically just more than the minimum width necessary to cover the electric outlet 105. In an alternative embodiment, cover 80 is wider than that but still less than the full width of the base plate 103. Although the present invention does contemplate that an elegant version of cover 80 can be as wide of base plate 103, the preferred embodiment relies on the fact that the most elegant and lightweight version of cover 80 will not be as wide as base plate 103.

In one preferred embodiment, the depth of the first cylindrical magnet 101 is less than the depth of the first small annular member 100 to accommodate the height of the head of the screws on the base plate 103 which project out slightly from the base plate 103.

Covers 10 are easily stackable because their magnets 31, 34 are aligned. Similarly, covers 80 are easily stackable because their magnet 101 is aligned.

Although the present invention has been described with the use of cylindrical magnets inside annular openings. This is preferred because screw heads are circular. Notwithstanding this, it is contemplated by the present invention that in an alternative embodiment that may be inferior, magnets and opening having a different configuration than circular can be employed and still function in accordance with the spirit of the present invention.

An additional application of the present invention is a safety cover akin in structure to the decor cover 10 or the old fashioned toggle switch cover 40 except that inside the frame 12 or frame 42 there would be snugly placed between the left and right side walls 14, 16 or left and right side walls 44, 46 an insert that allows covers 10 or 40 to be inserted into an electric outlet. The insert, typically made of plastic, in one preferred embodiment would be comprised of a flat face that is "caught" between the left and right side walls 14 or 16 or left and right side walls 44, 46 of covers 10 or 40. The flat face would have four prongs projecting perpendicularly therefrom that conform to and fit neatly into the four places along the outlet where typically two pairs of prongs from two electric plugs fit into. The prongs of the insert are integrally connected to the flat face of the insert.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A cover for a decor light switch, the décor light switch having a base plate, the cover comprising:

a hollow frame having a left side, a right side, a top, a bottom, a flat front and an open rear, a first small annular member projecting from a rear wall of the front in an area of the top and having a depth corresponding to a width of the left and right sides, a first cylindrical magnet located securely inside the first small annular member, a second small annular member projecting from a rear wall of the front in an area of the bottom and having a depth corresponding to a width of the left and right side, a second cylindrical magnet located securely inside the second small annular member, each of the first and second cylindrical magnets positioned so that they are aligned with and able to contact a head of a metal screw on the base plate, the magnets together being strong enough to hold the cover, wherein the cover includes a top internal horizontal wall below the first small annular member and a bottom internal horizontal wall above the second small annular member, the top and bottom internal horizontal walls to make it harder to slide the cover.

2. A cover for a decor light switch, the décor light switch having a base plate, the cover comprising:

a hollow frame having a left side, a right side, a top, a bottom, a flat front and an open rear, a first small annular member projecting from a rear wall of the front in an area of the top and having a depth corresponding to a width of the left and right sides, a first cylindrical magnet located securely inside the first small annular member, a second small annular member projecting from a rear wall of the front in an area of the bottom and having a depth corresponding to a width of the left and right side, a second cylindrical magnet located securely inside the second small annular member, each of the first and second cylindrical magnets positioned so that they are aligned with and able to contact a head of a metal screw on the base plate, the magnets together being strong enough to hold the cover, wherein the cover includes a top internal horizontal wall below the first small annular member and a bottom internal horizontal wall above the second small annular member, the top and bottom internal horizontal walls to make it harder to slide the cover, and wherein each of the magnets is strong enough by itself to hold the cover in a position wherein when said cover is rotated to a storage position.

3. A cover for an old-fashioned toggle light switch, the old-fashioned toggle light switch having a base plate, the cover comprising:

a hollow frame having a left side, a right side, a top, a bottom, a convex front and an open rear, the convex front having a central area of sufficient height to receive a switch element of the old-fashioned toggle light switch, a first small annular member projecting from a rear wall of the front in an area of the top and having a depth corresponding to a width of the left and right sides, a first cylindrical magnet located securely inside the first small annular member, a second small annular member projecting from a rear wall of the front in an area of the bottom and having a depth corresponding to a width of the left and right sides, a second cylindrical magnet located securely inside the second small annular member, each of the first and second cylindrical magnets positioned so that they are aligned with and able to contact a head of a metal screw on the base plate, the magnets together being strong enough to hold the cover, wherein the cover includes a top internal horizontal wall below the first small annular member to make it harder to slide the cover and includes a bottom internal horizontal wall above the second small annular member, to make it harder to slide the cover and wherein the top and bottom internal horizontal walls and the left and right sides form a square.

4. A cover for an old-fashioned toggle light switch, the old-fashioned toggle light switch having a base plate, the cover comprising:

a hollow frame having a left side, a right side, a top, a bottom, a convex front and an open rear, the convex front having a central area of sufficient height to receive a switch element of the old-fashioned toggle light switch, a first small annular member projecting from a rear wall of the front in an area of the top and having a depth corresponding to a width of the left and right sides, a first cylindrical magnet located securely inside the first small annular member, a second small annular member projecting from a rear wall of the front in an area of the bottom and having a depth corresponding to a width of the left and right sides, a second cylindrical magnet located securely inside the second small annular member, each of the first and second cylindrical magnets positioned so that they are aligned with and able to contact a head of a metal screw on the base plate, the magnets together being strong enough to hold the cover, wherein the cover includes a top internal horizontal wall below the first small annular member and a bottom internal horizontal wall above the second small annular member, the top and bottom internal horizontal walls to make it harder to slide the cover, and wherein each of the magnets is strong enough by itself to hold the cover in a position when said cover is rotated to a storage position.

* * * * *